US011302049B2

(12) United States Patent
Bastide et al.

(10) Patent No.: US 11,302,049 B2
(45) Date of Patent: *Apr. 12, 2022

(54) PREVENTING TRANSITION SHOCKS DURING TRANSITIONS BETWEEN REALITIES

(71) Applicant: International Business Machines Corporation, Armonk, NY (US)

(72) Inventors: Paul R. Bastide, Ashland, MA (US); Matthew E. Broomhall, Goffstown, NH (US); Liam S. Harpur, Skerries (IE); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/130,453

(22) Filed: Dec. 22, 2020

(65) Prior Publication Data

US 2021/0110590 A1 Apr. 15, 2021

Related U.S. Application Data

(63) Continuation of application No. 16/582,859, filed on Sep. 25, 2019, now Pat. No. 10,984,571, which is a
(Continued)

(51) Int. Cl.
*G06T 11/60* (2006.01)
*G06T 7/50* (2017.01)
(Continued)

(52) U.S. Cl.
CPC ............... *G06T 11/60* (2013.01); *G06T 7/50* (2017.01); *G06V 20/10* (2022.01); *G06F 1/163* (2013.01);
(Continued)

(58) Field of Classification Search
None
See application file for complete search history.

(56) References Cited

U.S. PATENT DOCUMENTS 6,961,055 B2 11/2005 Doak et al.
7,722,526 B2 5/2010 Kim
(Continued)

OTHER PUBLICATIONS

List of IBM Patents or Patent Applications Treated as Related, Jan. 15, 2021, pp. 1-2.

*Primary Examiner* — YuJang Tswei
(74) *Attorney, Agent, or Firm* — Robert A. Voigt, Jr.; Shackelford, Bowen, McKinley & Norton, LLP

(57) ABSTRACT

A method, system and computer program product for transitioning between different realities. The distance of the objects from a reference point in the first and second reality environments is determined. For example, the distance of the object's location in the first reality environment from a reference point (e.g., camera system) as well as the distance of the object's location in the second reality environment from the reference point is determined. A determination is made as to whether the likelihood of a transition shock event (e.g., motion sickness) occurring as a user transitions between the first and second reality environments exceeds a threshold value. In response to the likelihood of the transition shock event occurring exceeding the threshold value, the distance of the object from the reference point in the first and/or second reality environments is modified so as to prevent users from experiencing transition shocks when transitioning between realities.

20 Claims, 5 Drawing Sheets

Related U.S. Application Data continuation of application No. 16/271,481, filed on Feb. 8, 2019, now Pat. No. 10,580,186, which is a continuation of application No. 15/889,858, filed on Feb. 6, 2018, now Pat. No. 10,275,919.

(51) Int. Cl.
  *G06V 20/10* (2022.01)
  *G06F 1/16* (2006.01)
  *G06F 3/01* (2006.01)

(52) U.S. Cl.
  CPC ............. *G06F 3/011* (2013.01); *G06F 3/012* (2013.01); *G06F 2203/011* (2013.01)

(56) References Cited

U.S. PATENT DOCUMENTS

| | | | |
|---|---|---|---|
| 8,326,855 B2 | 12/2012 | Chandra et al. | |
| 8,831,278 B2 | 9/2014 | Fedorovskaya et al. | |
| 9,153,009 B2 | 10/2015 | Kim | |
| 9,373,213 B1 | 6/2016 | Archer | |
| 9,741,169 B1* | 8/2017 | Holz | G02B 27/0172 |
| 10,134,084 B1 | 11/2018 | Gabriele et al. | |
| 2014/0063058 A1* | 3/2014 | Fialho | G06T 19/00 345/633 |
| 2014/0306874 A1 | 10/2014 | Finocchio et al. | |
| 2015/0068052 A1 | 3/2015 | Krueger | |
| 2015/0235451 A1 | 8/2015 | Schowengerdt et al. | |
| 2016/0209648 A1 | 7/2016 | Haddick et al. | |
| 2016/0228771 A1 | 8/2016 | Watson | |
| 2016/0313790 A1 | 10/2016 | Clement et al. | |
| 2016/0364915 A1 | 12/2016 | Smith et al. | |
| 2017/0214782 A1* | 7/2017 | Brinda | H04M 1/72439 |
| 2017/0228931 A1 | 8/2017 | Parker et al. | |
| 2017/0262045 A1 | 9/2017 | Rouvinez et al. | |
| 2017/0323485 A1 | 11/2017 | Samec et al. | |
| 2017/0345219 A1 | 11/2017 | Holz | |
| 2017/0357327 A1* | 12/2017 | Dimitrov | G06F 3/011 |
| 2017/0365084 A1 | 12/2017 | Hayashida | |
| 2018/0024630 A1* | 1/2018 | Goossens | G06F 3/011 345/156 |
| 2019/0065027 A1* | 2/2019 | Hauenstein | G06F 3/014 |
| 2021/0056758 A1* | 2/2021 | Yerli | G06T 19/006 |

\* cited by examiner

| | | |
|---|---|---|
| 501 | CONTEXT | EVENT MANAGEMENT |
| 502 | CLASSIFICATION | INFORMATION TECHNOLOGY |
| 503 | LIKELY TRANSITION | VR TO AR |
| 504 | TRANSITION TIME | 239 SECONDS |
| 505 | FOCUS OBJECT | LAPTOP1 |
| 506 | RELATIVE DISTANCE (CURRENT) | 6 METERS |
| 507 | RELATIVE DISTANCE (FUTURE REALITY) | 2 METERS |
| 508 | RECOMMENDATION | TRANSITION OBJECT |
| 509 | TRANSITION PHASE | BEFORE (1 METER) AND AFTER (3 METERS) |
| 510 | SENSITIVITY | 245 |
| 511 | USER ID | USER59 |

FIG. 5

PREVENTING TRANSITION SHOCKS DURING TRANSITIONS BETWEEN REALITIES

TECHNICAL FIELD

The present invention relates generally to virtual reality and augmented reality systems, and more particularly to preventing transition shocks (e.g., disorientation, nauseousness, motion sickness) during transitions between realities (e.g., transitioning between virtual reality and augmented reality environments).

BACKGROUND

Virtual reality (VR) is a computer technology that uses virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, and with high quality VR move around in it and interact with virtual features or items. The effect is commonly created by VR headsets consisting of a head-mounted display with a small screen in front of the eyes, but can also be created through specially designed rooms with multiple large screens.

Augmented reality (AR) is a live direct or indirect view of a physical, real-world environment whose elements are "augmented" by computer-generated perceptual information, ideally across multiple sensory modalities, including visual, auditory, haptic, somatosensory, and olfactory. The overlaid sensory information can be constructive (i.e., additive to the natural environment) or destructive (i.e., masking of the natural environment) and is spatial registered with the physical world such that it is perceived as an immersive aspect of the real world environment (also referred to herein as the "real reality"). In this way, augmented reality alters one's current perception of a real world environment, whereas, virtual reality replaces the real world environment with a simulated one.

Currently, when a user transitions between different realities, such as between the virtual reality and the augmented reality environments or between the virtual reality and the real reality environments, the user may experience disorientation, motion sickness and/or nauseousness thereby degrading the user's experience.

SUMMARY

In one embodiment of the present invention, a computer-implemented method for transitioning between different realities comprises developing a statistical model for predicting transitions between different realities when a user performs various actions. The method further comprises monitoring actions of a user. The method additionally comprises determining whether a probability of the user transitioning between a first reality environment and a second reality environment exceeds a first threshold value based on the monitored actions of the user and the statistical model. Furthermore, the method comprises ascertaining whether a probability of a transition shock event occurring exceeds a second threshold value as the user transitions between the first and second reality environments in response to the probability of the user transitioning between the first and second reality environments exceeding the first threshold value, where the transition shock event is an occurrence of adverse symptoms experienced by the user as the user transitions between the first and second reality environments. Additionally, the method comprises modifying a distance of an object from a reference point in one or more of the first reality environment and the second reality environment in response to ascertaining that the probability of the transition shock event occurring exceeds the second threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 illustrates a record detailing the modification of the distance of the object(s) from the reference point in the first reality environment and/or the second reality environment so that the user will be less likely to experience a transition shock in accordance with an embodiment of the present invention.

DETAILED DESCRIPTION

The present invention comprises a method, system and computer program product for transitioning between different realities. In one embodiment of the present invention, the distance of objects from a reference point in the first and second reality environments is determined. For example, the distance of the object's location in the first reality environment from a reference point (e.g., camera system) as well as the distance of the object's location in the second reality environment from the reference point is determined. A determination is made as to whether the likelihood of a transition shock event occurring as a user transitions between the first and second reality environments exceeds a threshold value. A "transition shock event," as used herein, refers to the occurrence of adverse symptoms, such as disorientation, nauseousness or motion sickness, experienced by the user when the user transitions between different realities. In response to the likelihood of the transition shock event occurring exceeding the threshold value, the distance of the object from the reference point in the first and/or second reality environments is modified so as to prevent users from experiencing transition shocks (e.g., disorientation, nauseousness, motion sickness) when transitioning between realities (e.g., transitioning between the virtual reality and augmented reality environments).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with transitioning between different realities, such as virtual reality, augmented reality and real reality environments, the principles of the present invention may be applied to transitioning between other realities, such as a mixed reality environment (merging of real and virtual worlds to produce new environments and visualizations where physical and digital objects co-exist and interact in real time). A person of ordinary skill in the art would be capable of applying the principles of the present invention to such implementations. Further, embodiments applying the principles of the present invention to such implementations would fall within the scope of the present invention.

Figure 1:
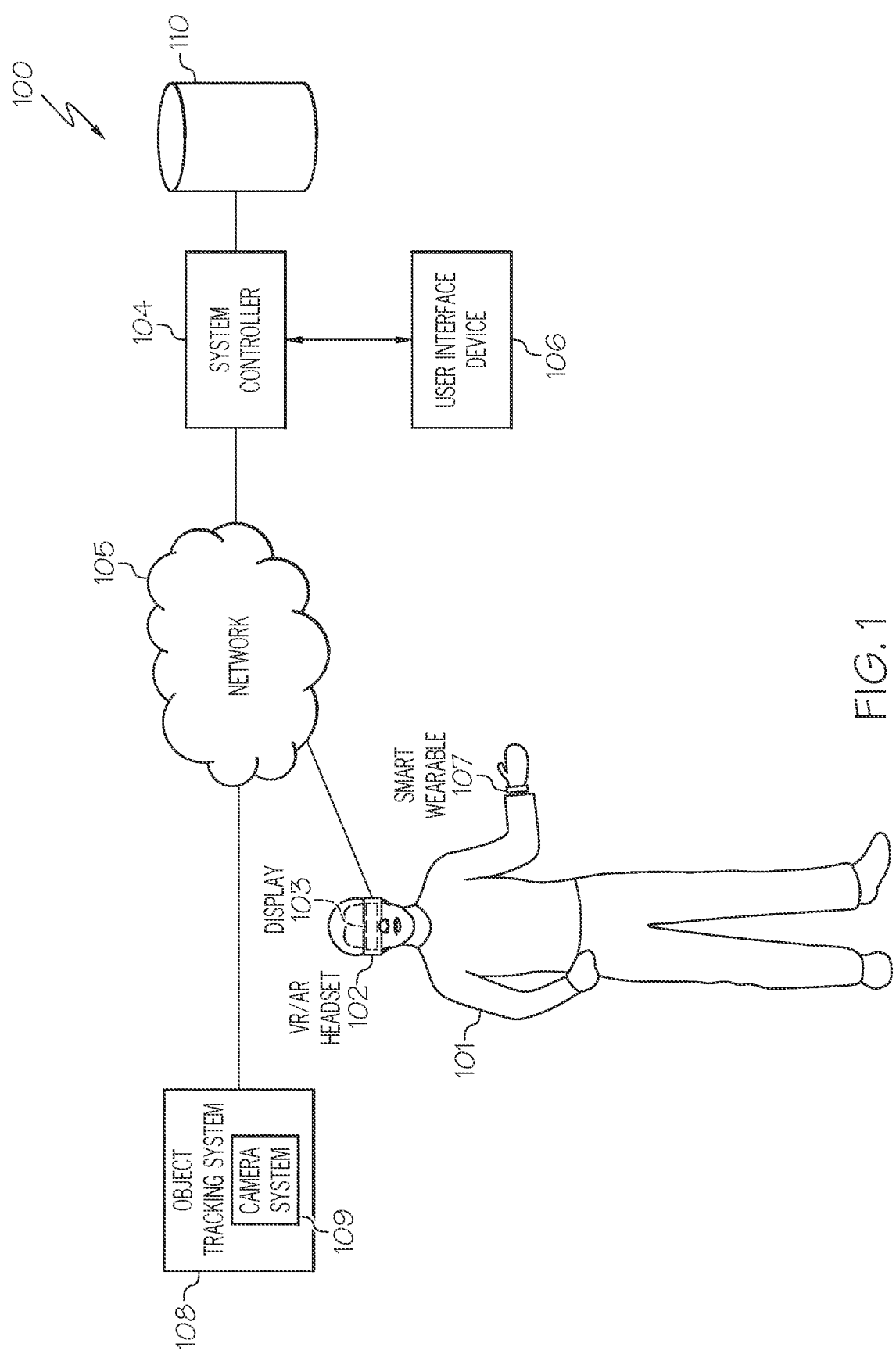
FIG. 1 illustrates a virtual reality/augmented reality/real reality system configured in accordance with an embodiment of the present invention.

Referring now to the Figures in detail, FIG. 1 illustrates a virtual reality/augmented reality/real reality system 100 configured in accordance with an embodiment of the present invention. System 100 is configured to allow a user 101 to transition between different realities, such as transitioning between the virtual reality, the augmented reality and real reality environments. In one embodiment, user 101 may wear a virtual reality/augmented reality (VR/AR) headset 102 that includes a display 103 providing a graphical environment for VR generation and/or AR generation. The graphical environment includes graphical images and/or computer-generated perceptual information. Display 103 encompasses part or all of a user's field of view.

Exemplary embodiments of headset 102 include a visor, a helmet, goggles, glasses and other similar arrangements. Examples of VR/AR headsets 102 include Oculus Rift® from Oculus VR®, VIVE® from HTC® Corporation and Gear VR® by Samsung® Electronics. A further example of VR/AR headset 102 presently available is the HoloLens® from Microsoft®. Furthermore, in one embodiment, headset 102 may include any one or more of the following: headphones to provide auditory feedback, vibration means to provide vibration feedback, and other sensors placed on or around the forward facing surface when in use.

System 100 further includes a system controller 104 in communication with display 103 of headset 102 via a network 105, which is capable of generating and/or controlling the graphical environment. System controller 104 may provide instructions to display 103, for example, by executing program code including an application program related to the VR and/or AR simulation.

In one embodiment, system controller 104 is a computing device, such as a mobile computing device (e.g., smartphone), which includes a camera and MEMS (microelectromechanical systems) sensors, such as an accelerometer, GPS (Global Positioning System) and a solid state compass, thereby enabling system controller 104 to be a suitable AR platform. In other embodiments, system controller 104 is a home video game console system, a set-top box or a media player. A description of the hardware configuration of system controller 104 being a mobile computing device is provided below in connection with FIG. 2. It is noted, however, that system controller 104 is not to be limited in scope to being a mobile computing device as discussed above.

Network 105 may be, for example, a wireless wide area network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Additionally, system 100 may include a user interface device 106 (may be separate from system controller 104 as shown in FIG. 1 or embodied as being part of system controller 104), through which user 101 interfaces with system controller 104. In particular, user 101 may interact with the application program related to the VR and/or AR simulation via user interface device 106.

Furthermore, system 100 includes a smart wearable 107 (e.g., smartwatch) worn by user 101, such as on the user's wrist. In one embodiment, smart wearable 107 is configured to monitor the user's heart rate, the user's body temperature, levels of a user's sweat, etc. Such monitored information may be transmitted to system controller 104, such as via network 105. Such monitored information is one of the means for monitoring the user's experience in transitioning between realities as discussed further below. For example, such monitoring may include information that indicates that user 101 experienced a "transition shock" when transitioning between realities. A "transition shock," as used herein, refers to the occurrence of adverse symptoms, such as disorientation, nauseousness or motion sickness, experienced by user 101 when user 101 transitions between different realties. Such symptoms may be determined based on the information acquired by smart wearable 107. For example, a high heart rate may indicate nausea or motion sickness. Cold sweating (sweating when the body temperature is not high) may indicate motion sickness. Excessive sweating may indicate disorientation.

Additionally, system 100 includes an object tracking system 108 connected to system controller 104 via network 105. Object tracking system 108 is configured to track objects in the field of view of user 101 and track the actions of user 101, such as tracking the user's hands, arms, legs, feet, head and torso. An "object," as used herein, refers to something material (whether graphical image or physical) that can be perceived by a user's senses. Object tracking system 108 may be used to provide a real time image stream to display 103 of headset 102, for example, an image stream depicting an avatar of user 101 and/or of other objects in the field of view of user 101 in the virtual reality environment.

In one embodiment, object tracking system 108 includes a camera system 109, including one or more cameras, such as a two-dimensional camera, a three-dimensional camera, an infrared camera and a time of flight (ToF) camera. Camera system 109 may include complementary metal-oxide-semiconductor (CMOS) or charged-coupled device (CCD) image sensors, or any other form of sensor to form images. An example of camera system 109 is the Pro C920 or C930 Full HD by Logitech®. In one embodiment, camera system 109 may include a camera with an infrared filter, which can be used for object tracking. In one embodiment, camera system 109 may include an RGB camera, which can be used for generation of augmented reality simulations. In one embodiment, different frames of a single camera may be processed in an alternating manner, e.g., with an infrared filter and for RGB, instead of separate cameras. Images of more than one camera may be stitched together to give a field of view equivalent to that of the user.

In one embodiment, camera system 109 may be mounted to or integrated as part of headset 102, or otherwise adapted to be worn on the head of user 101, whereby the capture area of the camera is arranged to record an equivalent to a field of view of user 101 when wearing headset 102. Additional cameras may be arranged elsewhere to track other parts of the body of user 101. Use of additional camera(s) to cover areas outside the immediate field of view of user 101 (or outside the field of view of other cameras within the system) may provide the benefit of allowing pre-rendering (or earlier initiation of other calculations) involved with the augmented or virtual reality rendition of those areas.

In one embodiment, system controller 104 implements an application program for determining from the image stream provided by camera system 109 the arrangement of objects in the capture area. For object tracking, the application program may implement known techniques, such as feature extraction and identification. For example, one such technique is the speed-up robust features (SURF) algorithm. In one embodiment, object tracking system 108 may include an ultrasonic, magnetic, or other field tracker, which may be mounted on headset 102, which is able to sense a magnetic field generated from a local base station, video game console or other apparatus. The magnetic field tracker provides information about the sensed magnetic field to an application program, which derives the position and orientation of the magnetic field tracker, and thus headset 102, relative to a base station or the magnetic field tracker from such information.

System 100 further includes a database 110 connected to system controller 104. In one embodiment, database 110 is configured to store information pertaining to the monitored user actions and experience when user 101 transitions between realities as well as stores the changes in distances among the objects as well as the changes in distances between the objects and a reference object when user 101 transitions between realities as discussed further below. Furthermore, database 110 may be configured to store the transition speed when user 101 transitions between realities as discussed further below. Furthermore, as discussed further below, the monitored user experience in transitioning between realities may be mapped to the changes in the distances among the objects and/or between the objects and a reference object (as well as the transition speed) when user 101 transitions between realities, and such mapping may be stored in database 110.

System 100 is not to be limited in scope to any one particular architecture. System 100 may include any number of users 101, headsets 102, displays 103, system controllers 104, networks 105, user interface devices 106, smart wearables 107, object tracking systems 108, camera systems 109 and databases 110.

Figure 2:
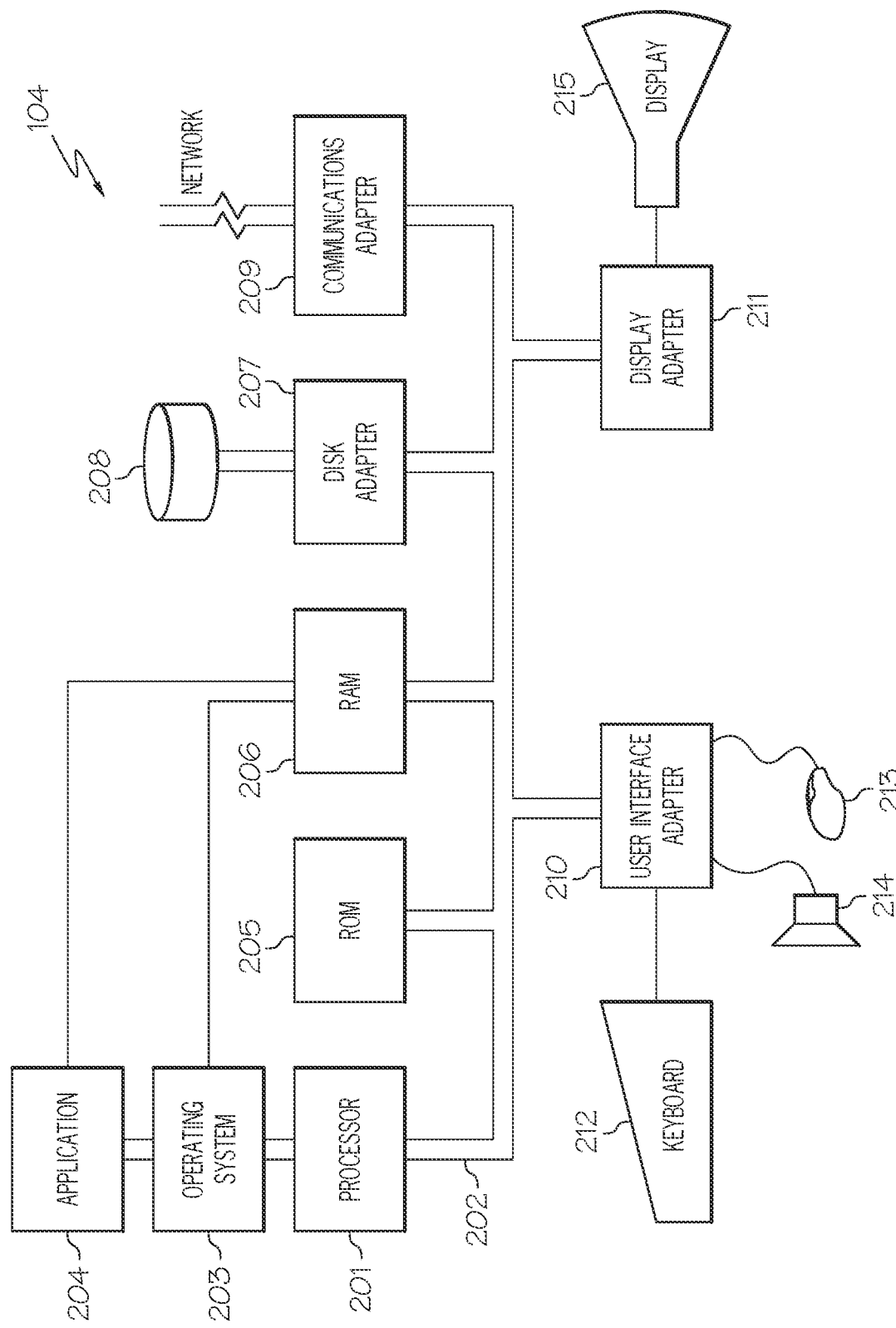
FIG. 2 illustrates an embodiment of the present invention of a hardware configuration of the system controller which is representative of a hardware environment for practicing the present invention.

Referring now to FIG. 2, FIG. 2 illustrates a hardware configuration of system controller 104 (FIG. 1) which is representative of a hardware environment for practicing the present invention. Referring to FIG. 2, system controller 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for preventing transition shocks during transitions between realities (e.g., transitioning between virtual reality and augmented reality environments) as discussed further below in connection with FIGS. 3-5.

Referring again to FIG. 2, read-only memory ("ROM") 205 is coupled to system bus 202 and includes a basic input/output system ("BIOS") that controls certain basic functions of system controller 104. Random access memory ("RAM") 206 and disk adapter 207 are also coupled to system bus 202. It should be noted that software components including operating system 203 and application 204 may be loaded into RAM 206, which may be system controller's 104 main memory for execution. Disk adapter 207 may be an integrated drive electronics ("IDE") adapter that communicates with a disk unit 208, e.g., disk drive.

System controller 104 may further include a communications adapter 209 coupled to bus 202. Communications adapter 209 interconnects bus 202 with an outside network (e.g., network 105 of FIG. 1) thereby enabling system controller 104 to communicate with other devices.

I/O devices may also be connected to system controller 104 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to system controller 104 through keyboard 212 or mouse 213 and receiving output from system controller 104 via display 215 or speaker 214. Other input mechanisms may be used to input data to system controller 104 that are not shown in FIG. 2, such as display 215 having touch-screen capability and keyboard 212 being a virtual keyboard. It is noted that the input mechanisms discussed herein in connection with FIG. 2 may correspond to user interface device 106 of FIG. 1. System controller 104 of FIG. 2 is not to be limited in scope to the elements depicted in FIG. 2 and may include fewer or additional elements than depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, when a user transitions between different realities, such as between the virtual reality and the augmented reality environments or between the virtual reality and the real reality environments, the user may experience disorientation, motion sickness and/or nauseousness thereby degrading the user's experience.

Figure 3:
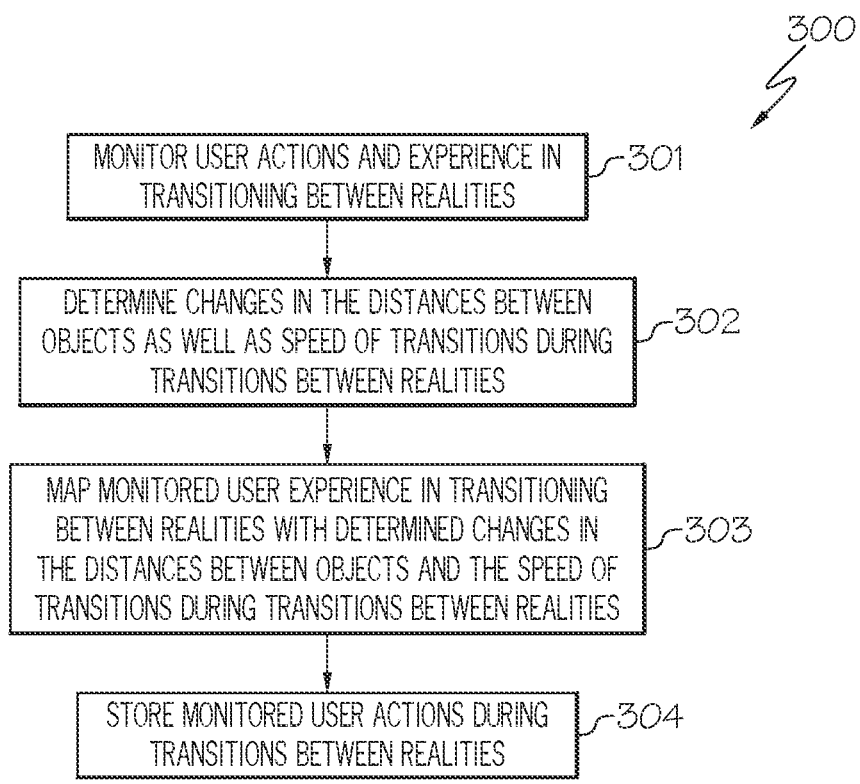
FIG. 3 is flowchart of a method for storing information pertaining to user actions and experiences in transitioning between realities which will be used to determine the likelihood of a transition shock event occurring in accordance with an embodiment of the present invention.
Figure 4:
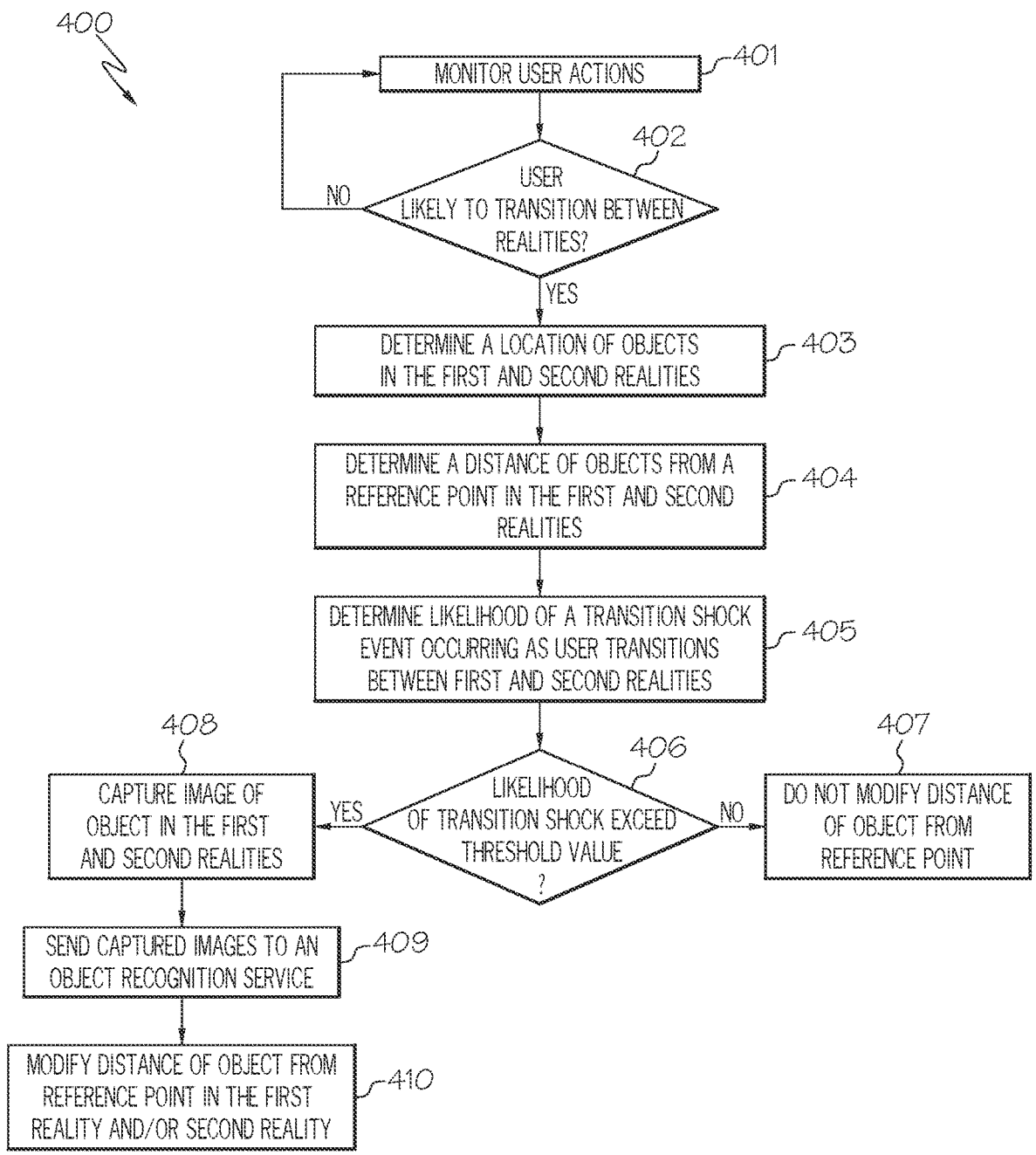
FIG. 4 is a flowchart of a method for preventing transition shocks during transitions between realities in accordance with an embodiment of the present invention.

The principles of the present invention provide a means for preventing transition shocks (e.g., disorientation, nauseousness, motion sickness) during transitions between realities (e.g., transitioning between virtual reality and augmented reality environments) as discussed below in connection with FIGS. 3-5. FIG. 3 is flowchart of a method for storing information pertaining to user actions and experiences in transitioning between realities which will be used to determine the likelihood of a transition shock event occurring. FIG. 4 is a flowchart of a method for preventing transition shocks during transitions between realities. FIG. 5 illustrates a record detailing the modification of the distance of the object(s) from the reference point in the first reality environment and/or the second reality environment so that the user will be less likely to experience a transition shock.

As discussed above, FIG. 3 is a flowchart of a method 300 for storing information pertaining to user actions and experiences in transitioning between realities in accordance with an embodiment of the present invention.

Referring to FIG. 3, in conjunction with FIGS. 1-2, in step 301, object tracking system 108 and smart, wearable 107 monitor user actions and experiences in transitioning between realities (e.g., transitioning between virtual reality and augmented reality environments, transitioning between virtual reality and real reality environments). Actions, as used herein, involve the movement of user 101, including the movement of hands, arms, legs, feet, head and torso. Such actions may involve physical reactions experienced during the transitions between realities as well as contextual reactions experienced during the transitions between realities. Experiences, as used herein, involve the user's response (e.g., symptoms) to transitioning between realities, which may be deduced by monitoring the user's heart rate, the user's body temperature, levels of a user's sweat, etc. via smart wearable 107. In one embodiment, such information acquired by object tracking system 108, smart wearable 107 is provided to system controller 104.

In step 302, object tracking system 108 and system controller 104 determine the changes in the distances between the objects (including the distance among the objects as well as the distance between the objects and a reference object) as well as the speed of transitions during the transitions between realities. In one embodiment, the distance between the objects (e.g., avatar) displayed in the environment (e.g., virtual reality/augmented reality/real reality environment) as well as between the objects and a reference object (also referred to herein as the "reference point"), such as camera system 109, are determined from camera system 109 in conjunction with an object recognition service, such as OpenCV. For example, in one embodiment, images of objects are captured by camera system 109. The object in the image is recognized using the object recognition service. In one embodiment, the coordinate of the recognized object is determined by reconstructing the depth of the real reality environment (including when the real reality environment is being used to generate the virtual reality or augmented reality environment) from the point of view of camera system 109. Various "shape from X" techniques (e.g., shape from stereo, motion, shading or texture) may be used to generate the depth image from the point of view of camera system 109. A depth map stores, for each pixel in the real-world image, the distance from the XY (image) plane of camera system 109 (reference Object) to the real-world surface projected into that pixel. In this manner, the location (coordinate) of the objects as well as the distance between the objects (including the distance between the objects and a reference object, such as camera system 109) can be determined. Other embodiments for determining the distance between the objects include using triangle similarity. Changes in such locations and distances when user 101 transitions between realities may then be determined by determining the differences in the location (coordinate) of the objects and the differences in the distances between the objects before and after user 101 transitions between realties.

In one embodiment, the speed of transitions during the transitions between realities is determined by system controller 104 (e.g., time-tracking application, such as application 204) tracking the difference in time between the time user 101 initiates the transition and the time the transition is completed. In one embodiment, the initiation of a transition may be user-specified and the completion of the transition may be indicated by headset 102. In one embodiment, the completion of the transition may be indicated by system controller 104 identifying an exit or end activity that indicates the completion of the transition. In one embodiment, such exit or end activity may be tagged indicating the completion of the transition.

In step 303, system controller 104 maps the monitored user experience in transitioning between realities with the determined changes in the distances between the objects (including the distance among the objects as well as the distance between the objects and a reference object) as well as the speed of transitions during the transitions between realities. For example, system controller 104 maps the user experience (e.g., increased heart rate) in transitioning between the augmented reality and virtual reality environments with the change in the coordinate of the avatar object from 332,455,233 to 334,456,234 and the speed of the transition (e.g., fifteen seconds). Such information may be used by system controller 104 to determine the likelihood of a transition shock event occurring when the user transitions from a first reality (e.g., augmented reality environment) to a second reality (e.g., virtual reality environment). For example, if it can be determined that user 101 likely experienced a transition shock event (e.g., nausea due to an excessively high heart rate) when transitioning from the augmented reality environment to the virtual reality environment when the transition speed was fifteen seconds along with the avatar object changing coordinates from 332,455, 233 to 334,456,234, then it may be inferred that user 101 would experience similar adverse symptoms under similar conditions. As discussed further below, if system controller 104 determines that user 101 will make a similar transition under a similar condition, system controller 104 may modify the distances between the objects (e.g., modify the distance between the object(s) and a reference object) when transitioning from the first reality to the second reality in an attempt to prevent user 101 from experiencing a transition shock event. Such mapped information may be stored in a data storage device (e.g., memory 205, disk unit 208) or in database 110.

In connection with the mapping discussed above, in one embodiment, system controller 104 may also generate models (statistical models) of previous transition events between realities and the speed of the transition events in transitioning between the realities in relation to motion in a physical space. "Motion," as used herein, involves the motion or movement of objects during the transition between realities which is tracked by object tracking system 108. The relationship between the motion of objects during the transition between realities and the speed of the transition event may be statistically modeled. Such models may be stored in a data storage device (e.g., memory 205, disk unit 208) or in database 110.

In step 304, system controller 104 stores the monitored user actions during transitions between realities, such as in a data storage device (e.g., memory 205, disk unit 208) or in database 110.

Information pertaining to user actions and experiences in transitioning between realities will be used to determine the likelihood of a transition shock event occurring as discussed below in connection with FIG. 4.

FIG. 4 is a flowchart of a method 400 for preventing transition shocks during transitions between realities in accordance with an embodiment of the present invention.

Referring to FIG. 4, in conjunction with FIGS. 1-3, in step 401, object tracking system 108 monitors user actions. As discussed above, actions, as used herein, involve the movement of user 101, including the movement of hands, arms, legs, feet, head and torso.

In step 402, a determination is made by system controller 104 as to whether user 101 is likely to transition between realities (between the first and second realities). For example, system controller 104 determines whether the likelihood of user 101 transitioning between realities exceeds a threshold value. For instance, system controller 104 may develop a statistical model based on the stored user actions in transitioning between realities to assess a likelihood of whether user 101 is likely to transition between realities based on the monitored user actions of step 401. For example, the statistical model may include probabilities for transitioning between realities when user 101 preforms various actions. Such actions may be compared with the current monitored user actions (step 401) to determine a likelihood of transitioning between realities. Such a likelihood corresponds to a probability value which is compared to a threshold value.

In another embodiment, system controller 104 determines whether user 101 is likely to transition between realities based on the user's calendar. For example, system controller 104 may have access to the user's calendar application (e.g., application 204) which indicates when user 101 will be participating in the VR or AR environment. In such an example when the user is scheduled to participate in the VR or AR environment, system controller 104 would assess a probability value of user 101 transitioning between realities that exceeds the threshold value.

In another embodiment, system controller 104 determines when user 101 is likely to transition between realities based on feedback provided to an artificial intelligence application (e.g., application 204) running on system controller 104. User 101 may continually interact with the artificial intelligence application and provide feedback, such that based on certain commands, the artificial intelligence application can determine that user 101 is likely transitioning to another reality. In such an example, system controller 104 would assess a probability value of user 101 transitioning between realities to exceed the threshold value.

If system controller 104 does not determine that user 101 is likely to be transitioning between realities, then object tracking system 108 continues to monitor user actions in step 401.

If, however, system controller 104 determines that user 101 is likely to be transitioning between realities (between the first and second realities), then, in step 403, system controller 104 determines a location of objects in the first and second realities. In one embodiment, the location of objects in the first reality is determined using object tracking system 108 as discussed above in step 302. In one embodiment, the location of the same objects in the second reality is determined using statistical analysis. Such statistical analysis involves analyzing the stored data (e.g., stored in database 110) pertaining to object locations in the second reality. For example, if the avatar object named Mercury is positioned at coordinates 334,422,233; 334,412,212; and 334,423,321 during the times user 101 has transitioned to the augmented reality environment from the virtual reality environment, then it may be determined statistically (e.g., using directional statistics) that Mercury will likely be positioned at 334,422,222 when user 101 transitions to the augmented reality environment.

In step 404, system controller 104 determines a distance of the objects from a reference point in the first and second realities. That is, system controller 104 determines the distance of the object's location in the first reality environment from a reference point (e.g., camera system 109) as well as determines the distance of the object's location in the second reality environment from the reference point. The object's location (e.g., coordinate) in the first and second reality environments are determined in step 403. In one embodiment, the distance of the object from the reference point is determined based on the expected time of interaction (i.e., the time of interaction with the environment, such as the virtual reality environment). In one embodiment, the distance of the object from the reference point is determined based on the movement of objects in relation to each other. In one embodiment, the distance of the object from the reference point is determined based on the tagged object distances. For example, objects may be tagged with a distance between another object which may be used to determine the distance of the object from the reference point.

In step 405, system controller 104 determines the likelihood of a transition shock event occurring as the user transitions between the first reality environment to the second reality environment. A "transition shock" or a "transition shock event," as used herein, refers to the occurrence of adverse symptoms, such as disorientation, nauseousness or motion sickness, experienced by user 101 when user 101 transitions between different realties. In one embodiment, the likelihood of the transition shock event occurring is ascertained based on one or more of the following: historical occurrences of symptoms experienced during transitions between realities (discussed in connection with FIG. 3), historical occurrences of physical reactions experienced during transitions between realities (discussed in connection with FIG. 3), modeling of previous transition events between realities (discussed in connection with FIG. 3) and speed of transition events in transitioning between realities in relation to motion in a physical space (discussed in connection with FIG. 3). In one embodiment, such information is stored in database 110. In one embodiment, the likelihood of the transition shock event occurring is ascertained based on the location (coordinate) and/or distance of the object from the reference point in the first and second reality environments.

For example, suppose that user 101 experienced a high heart rate indicating nausea (historical occurrence of symptom) along with a downward movement of the head indicating nausea (historical occurrence of physical reaction) when user 101 transitions from the virtual reality environment to the augmented reality environment when the transition speed was fifteen seconds along with the avatar object changing coordinates from 332,455,233 to 334,456,234. A probability (e.g., value ranging from 0 to 1, with 1 indicating the event will definitely occur and 0 indicating the event will definitely not occur) that a transition shock event will occur is assessed by system controller 104 using the determined location of the objects in the first and second realities (determined in step 403) and the determined distance of the objects from a reference point in the first and second realities (determined in step 404). For example, if user 101 is likely to transition between the virtual reality environment to the augmented reality environment under similar conditions as in the example discussed above (e.g., similar transition speed with similar coordinates of the avatar object), then it may be inferred that user 101 would likely experience similar adverse symptoms (i.e., system controller 104 would assess a high probability that a transition shock event is likely to occur).

In step 406, a determination is made as to whether the likelihood of a transition shock occurring exceeds a threshold value, which may be user-selected. In one embodiment, the probability value ascertained in step 405 is compared with the threshold value. If the probability value does not exceed the threshold value, then, in step 407, the distances of the objects from the reference point in the first and/or second reality environment are not modified by system controller 104.

If, however, the probability value exceeds the threshold value, then, in step 408, camera system 109 and system controller 104 capture the images of the objects in the first and second realities, where the images of the objects in the first reality environment are captured by camera system 109 (and sent to system controller 104) and the images of the same objects to be presented in the second reality environment are generated by system controller 104 based on the determined location of the same objects in the second reality environment as determined in step 403.

In step 409, system controller 104 sends the captured images to an object recognition service, such as OpenCV. The object in the image is recognized using the object recognition service.

In step 410, system controller 104 modifies the distance of the object(s) from the reference point in the first reality and/or the second reality so that the user will less likely experience a transition shock. For example, the distance of the object(s) from the reference point in the first reality and/or the second reality is modified based on the position of future scenes and depths and specific user cohorts (e.g., a user of the video game of Minecraft® may have a different susceptibility to transition shock than an architect, where such susceptibility is determined based on historical experiences of transition shock during transitions between different realities).

In one embodiment, the distance of the object(s) from the reference point in the first reality and/or the second reality is modified based on previous locations of the objects and/or distances of the objects from the reference point where no transition shock was experienced by user 101. In one embodiment, based on previous transitions between realities, a model is generated by system controller 104 detailing locations of the objects and/or distances of the objects from the reference point where transition shocks occur and do not occur. Such a model may be used by system controller 104 to modify the distance of the object(s) from the reference point in the first, reality and/or the second reality so that the user will less likely experience a transition shock. To be clear, modifying the distance of the object(s) from the reference point involves changing the location (coordinate) of the objects.

A record detailing such a modification is shown in FIG. 5. FIG. 5 illustrates a record detailing the modification of the distance of the object(s) from the reference point in the first reality environment and/or the second reality environment so that the user will be less likely to experience a transition shock in accordance with an embodiment of the present invention.

Referring to FIG. 5, record 500 includes the context 501 (e.g., event management), the classification 502 (e.g., information technology), likely transition 503 (e.g., VR to AR), transition time 504 (e.g., 239 seconds), focus object 505 (e.g., laptop1), relative distance (current) 506 (e.g., 6 meters), relative distance (future reality) 507 (e.g., 2 meters), recommendation 508 (e.g., transition object), transition phase 509 (e.g., before (1 meter) AND after (3 meters), sensitivity 510 (e.g., 245) and userID 511 (e.g., user59). Focus object 505 may refer to the reference point and the current relative distance 506 refers to the current distance of the object from the reference point and the future relative distance 507 refers to the distance of the object from the reference point in the future reality environment. Recommendation 508 refers to whether or not it is recommended to transition the object. Transition phase 509 refers to the changes in the distance of the object from the reference point that need to occur in order for the location of the object to have the desired distance from the reference point. Sensitivity 510 refers to a number that is assigned by system controller 104 detailing the level of sensitivity or likelihood of exhibiting a transition shock. In one embodiment, the higher the number, the more sensitive or more likely user 101 will experience a transition shock. In one embodiment, the level of sensitivity is determined by system controller 104 based on how close are the locations of the objects and the distances of the objects from the reference point to those locations and distances that caused user 101 to experience a transition shock when transitioning between realities. UserID 511 refers to an identification assigned to user 101.

In this manner, user 101 may be prevented from experiencing transition shocks (e.g., disorientation, nauseousness, motion sickness) when transitioning between realities (e.g., transitioning between the virtual reality and augmented reality environments). As a result, users will be able to participate in several different reality systems (e.g., virtual reality, augmented reality, real reality), one after the other, without experiencing transition shocks. That is, the technical problem of having different reality systems being able to be utilized by the user, one after the other, is addressed by the present invention. As discussed above, the present invention provides a technological solution to the technical problem by preventing users from experiencing transition shocks when transitioning between realities thereby encouraging user interactions between different reality systems, such as virtual reality and augmented reality systems. That is, integration and interchangeability between different reality systems is improved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for transitioning between different realities, the computer program product comprising one or more computer readable storage mediums having program code embodied therewith, the program code comprising programming instructions for:

developing a statistical model for predicting transitions between different realities when a user performs various actions;

monitoring actions of a user;

determining whether a probability of said user transitioning between a first reality environment and a second reality environment exceeds a first threshold value based on said monitored actions of said user and said statistical model;

ascertaining whether a probability of a transition shock event occurring exceeds a second threshold value as said user transitions between said first and second reality environments in response to said probability of said user transitioning between said first and second reality environments exceeding said first threshold value, wherein said transition shock event is an occurrence of adverse symptoms experienced by said user as said user transitions between said first and second reality environments; and modifying a distance of an object from a reference point in one or more of said first reality environment and said second reality environment in response to ascertaining that said probability of said transition shock event occurring exceeds said second threshold value.

2. The computer program product as recited in claim 1, wherein said probability of said transition shock event occurring is ascertained based on one or more of the following: historical occurrences of symptoms experienced during transitions between realities, historical occurrences of physical reactions experienced during transitions between realities, modeling of previous transition events between realities and speed of transition events in transitioning between realities in relation to motion in a physical space.

3. The computer program product as recited in claim 1, wherein said actions compose movement of hands, arms, legs, feet, head and torso of said user.

4. The computer program product as recited in claim 1, wherein the program code further comprises the programming instructions for:
monitoring experiences of said user in transitioning between different realities, wherein said user experiences comprise a user's response to transitioning between different realities.

5. The computer program product as recited in claim 4, wherein said user's response is deduced by monitoring a heart rate, a body temperature and levels of sweat of said user.

6. The computer program product as recited in claim 5, wherein a smart wearable worn by said user monitors said heart rate, said body temperature and said levels of sweat of said user.

7. The computer program product as recited in claim 1, wherein said distance of said object from said reference point in one or more of said first reality environment and said second reality environment is modified based on position of future scenes and depths in other realities and specific user cohorts.

8. The computer program product as recited in claim 1, wherein the program code further comprises the programming instructions for:
capturing an image of said object in said first and second reality environments in response to ascertaining that said probability of said transition shock event occurring exceeds said second threshold value; and
sending said captured image to an object recognition service.

9. The computer program product as recited in claim 1, wherein said probability of said transition shock event occurring is ascertained based on location and said distance of said object from said reference point in said first and second reality environments.

10. The computer program product as recited in claim 1, wherein said first and second reality environments comprise one of the following: an augmented reality environment, a virtual reality environment and a real reality environment, wherein said first and second reality environments are different reality environments.

11. A system, comprising:
a memory for storing a computer program for transitioning between different realities; and
a processor connected to said memory, wherein said processor is configured to execute program instructions of the computer program comprising:
developing a statistical model for predicting transitions between different realities when a user performs various actions;
monitoring actions of a user;
determining whether a probability of said user transitioning between a first reality environment and a second reality environment exceeds a first threshold value based on said monitored actions of said user and said statistical model;
ascertaining whether a probability of a transition shock event occurring exceeds a second threshold value as said user transitions between said first and second reality environments in response to said probability of said user transitioning between said first and second reality environments exceeding said first threshold value, wherein said transition shock event is an occurrence of adverse symptoms experienced by said user as said user transitions between said first and second reality environments; and
modifying a distance of an object from a reference point in one or more of said first reality environment and said second reality environment in response to ascertaining that said probability of said transition shock event occurring exceeds said second threshold value.

12. The system as recited in claim 11, wherein said probability of said transition shock event occurring is ascertained based on one or more of the following: historical occurrences of symptoms experienced during transitions between realities, historical occurrences of physical reactions experienced during transitions between realities, modeling of previous transition events between realities and speed of transition events in transitioning between realities in relation to motion in a physical space.

13. The system as recited in claim 11, wherein said actions comprise movement of hands, arms, legs, feet, head and torso of said user.

14. The system as recited in claim 11, wherein the program instructions of the computer program further comprise:
monitoring experiences of said user in transitioning between different realities, wherein said user experiences comprise a user's response to transitioning between different realities.

15. The system as recited in claim 14, wherein said user's response is deduced by monitoring a heart rate, a body temperature and levels of sweat of said user.

16. The system as recited in claim 15, wherein a smart wearable worn by said user monitors said heart rate, said body temperature and said levels of sweat of said user.

17. The system as recited in claim 11, wherein said distance of said object from said reference point in one or more of said first reality environment and said second reality environment is modified based on position of future scenes and depths in other realities and specific user cohorts.

18. The system as recited in claim 11, wherein the program instructions of the computer program further comprise:
capturing an image of said object in said first and second reality environments in response to ascertaining that said probability of said transition shock event occurring exceeds said second threshold value; and
sending said captured image to an object recognition service.

19. The system as recited in claim 11, wherein said probability of said transition shock event occurring is ascertained based on location and said distance of said object from said reference point in said first and second reality environments.

20. The system as recited in claim 11, wherein said first and second reality environments comprise one of the following: an augmented reality environment, a virtual reality environment and a real reality environment, wherein said first and second reality environments are different reality environments.

* * * * *